US012800445B2

(12) United States Patent
Ostrow et al.

(10) Patent No.: US 12,800,445 B2
(45) Date of Patent: Nov. 17, 2026

(54) METHOD AND SYSTEM FOR WATER TREATMENT

(71) Applicant: Kemira Oyj, Helsinki (FI)

(72) Inventors: Niko Ostrow, Espoo (FI); Sampsa Greus, Espoo (FI)

(73) Assignee: Kemira Oyj, Helsinki (FI)

( * ) Notice: Subject to any disclaimer, the term of this patent is extended or adjusted under 35 U.S.C. 154(b) by 476 days.

(21) Appl. No.: 18/565,101

(22) PCT Filed: May 19, 2022

(86) PCT No.: PCT/FI2022/050339

§ 371 (c)(1),
(2) Date: Nov. 29, 2023

(87) PCT Pub. No.: WO2022/254084

PCT Pub. Date: Dec. 8, 2022

(65) Prior Publication Data

US 2024/0219271 A1 Jul. 4, 2024

(30) Foreign Application Priority Data

May 31, 2021 (FI) ...................................... 20215637

(51) Int. Cl.
*G01N 1/20* (2006.01)
*G01N 1/14* (2006.01)

(52) U.S. Cl.
CPC ..... *G01N 1/2035* (2013.01); *G01N 2001/205* (2013.01)

(58) Field of Classification Search
CPC ........... G01N 1/2035; G01N 2001/205; G01N 2001/1025; G01N 1/14; G01N 1/18; G01N 1/10; G01N 33/18; Y02W 10/10; B01D 21/30; C02F 1/52
See application file for complete search history.

(56) References Cited

U.S. PATENT DOCUMENTS

| | | | |
|---|---|---|---|
| 2008/0288111 A1 | 11/2008 | Yamaguchi et al. | |
| 2008/0314837 A1* | 12/2008 | Vanotti | A01C 3/00 210/705 |
| 2011/0155255 A1 | 6/2011 | Ladron de Guevara et al. | |
| 2017/0013653 A1* | 1/2017 | Keinan | |
| 2018/0217070 A1 | 8/2018 | Keinan | |
| 2020/0377389 A1 | 12/2020 | Jiang et al. | |

FOREIGN PATENT DOCUMENTS

| | | |
|---|---|---|
| JP | 5401087 B2 | 1/2014 |
| JP | 2018531395 A | 10/2018 |
| WO | 9944033 A2 | 9/1999 |
| WO | 2012010744 A1 | 1/2012 |

OTHER PUBLICATIONS

Letterman, R. D. et al., Development of a count performance evaluation procedure for on-line particle counters used in drinking water treatment, AWWA Research Foundation and American Water Works Association, Draft, 2001 USA.

* cited by examiner

*Primary Examiner* — Brian J. Sines
(74) *Attorney, Agent, or Firm* — Espatent Oy

(57) ABSTRACT

A method in which a sample analysis vessel is provided with a water sample from a sampling point upstream of a solid-liquid separation unit. Said providing a sample analysis vessel with a water sample comprises sucking the sample into the sample analysis vessel via a sample line by a suction pump positioned after the sample analysis vessel.

20 Claims, 4 Drawing Sheets

METHOD AND SYSTEM FOR WATER TREATMENT

TECHNICAL FIELD

The present disclosure generally relates to water treatment. The disclosure relates particularly, though not exclusively, to a method and system for obtaining samples from a sampling point.

BACKGROUND

This section illustrates useful background information without admission of any technique described herein representative of the state of the art.

Wastewater treatment plants are used to purify municipal sewage and/or industrial wastewater. In a conventional wastewater treatment plant, wastewater flows first to a mechanical preliminary treatment where different objects are removed from the wastewater, typically by one or more screens of different size. After the mechanical preliminary treatment, the wastewater flows into a primary treatment tank or tanks. The primary treatment is typically based on sedimentation of particles in the wastewater. Certain chemicals, typically coagulant(s) and flocculant(s) are dosed into a stream of wastewater prior to the wastewater enters the sedimentation tank(s). These chemicals aid solid particles in forming larger clusters, i.e. agglomerates, which are called flocs, that settle in the form of sludge, herein denoted as primary sludge, on the bottom of the tank(s). The primary sludge is typically separated from the tank(s) for further processing. The wastewater then enters a secondary treatment that may be based on biological processes. They use bacteria which consume contaminants, in particular biodegradable organics, carbon and phosphorus and some nitrogen. Biomass with organic and/or inorganic residue forms sludge. In order that the biological process runs properly the sludge (and bacteria) is pumped to a secondary sedimentation tank or tanks. The sludge settles on the bottom of the secondary sedimentation tank(s) from which the sludge is either guided back for re-use in the biological processes or separated for further processing. The effluent from the secondary sedimentation tank may be clean enough to be released to a recipient, or it may undergo further purification step(s).

In the disclosed water treatment process, a correct dosing of chemicals into the water stream is important. Water samples may be taken from the water stream so as to provide information for controlling the dosing. However, the handling of the samples may sometimes be challenging. For example, flocs formed within water stream may be easily broken when the sample is being taken so that the sample does not correctly reflect certain properties of the water stream anymore.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

It is an object of certain embodiments of the invention to provide an improved method for handling samples in a water treatment system or plant or at least to provide an alternative solution to existing technology.

According to a first example aspect of the invention there is provided a method comprising:

- providing a sample analysis vessel with a water sample from a sampling point upstream of a solid-liquid separation unit, wherein
- said providing a sample analysis vessel with a water sample comprises a suction pump, positioned after the sample analysis vessel, sucking the water sample from the sampling point to the sample analysis vessel via a sample line.

In certain embodiments, the solid-liquid separation unit is or comprises a solid-liquid separation unit of a water treatment system or a water treatment plant. Separation of sludge or similar from water in a solid-liquid separation unit may be based on flocs settling on the bottom of the unit or tank (sedimentation) or flocs floating on the top of the liquid/water (flotation). In certain embodiments, the solid-liquid separation unit is or comprises a sedimentation unit, or a flotation unit of a water treatment plant or system. In certain embodiments, the solid-liquid separation unit is or comprises a solid-liquid separation tank, such as a sedimentation tank or a flotation tank. The sedimentation tank in certain embodiments is a sedimentation tank of a wastewater treatment plant. The sedimentation tank in certain embodiments is a sedimentation tank of primary treatment of wastewater in a wastewater treatment plant. In certain other embodiments, the sedimentation tank is a sedimentation tank of secondary treatment of wastewater in a wastewater treatment plant.

The water treatment plant in certain embodiments is a wastewater treatment plant treating industrial wastewater, municipal wastewater or a combination thereof. In other embodiments, the water treatment plant is a raw water or drinking water treatment plant.

In certain embodiments, the water sample is taken from a sampling point in a process stream. In certain embodiments, the sampling point is a water channel or a well.

In certain embodiments, the sample line is a conduit extending from the sampling point to the sample analysis vessel and further to the suction pump. Accordingly, the sample line in certain embodiments is a conduit that is separate from the process stream or related water channel, and/or this conduit branches from the process stream or water channel at the sampling point.

The expression "suction pump positioned after the sample analysis vessel" means that the suction pump is positioned downstream of the sample analysis vessel (in the direction of the suction). In certain embodiments, the suction pump sucks the sample via the sample analysis vessel into the pump and discharges the sucked sample to a waste line (or for further processing).

In certain embodiments, the sample analysis vessel is a tank within a sedimentation simulation apparatus (or a tank within a flotation simulation apparatus as the case may be). In these embodiments, the purpose of the said simulation may be to obtain information for the control of the dosage of floc forming chemical(s).

In certain embodiments, the sampling point is at a point of the process stream or water channel downstream of a floc forming chemical dosing point. In certain embodiments, the sampling point is in a well forming part of the process stream or water channel.

In certain embodiments, the method comprises:

- sucking the sample as a laminar (i.e., non-turbulent) flow from the sampling point to the sample analysis vessel.

In certain embodiments, this is in order to transport flocs in the water sample into the sample analysis vessel without breaking the flocs.

In certain embodiments, the method comprises sucking the sample as a laminar flow from the sampling point to the sample analysis vessel and further to an outlet of the sample analysis vessel. Accordingly, in certain embodiments, also the flow within the sample analysis vessel is laminar.

In certain embodiments, the method comprises ensuring that the water sample within the sample analysis vessel correctly reflects water properties at the sampling point. In certain embodiments, this is achieved by sucking water from the sampling point via the sample analysis vessel to the pump and further through the pump (e.g. into an exhaust line) for a predetermined period of time, and only then switching the pump off. Accordingly, in certain embodiments, the method comprises:

sucking water from the sampling point via the sample analysis vessel to the pump and further through the pump for a predetermined period of time prior to taking a sample.

In certain embodiments, the method comprises:

closing a closing valve of the sample analysis vessel upstream of the sample analysis vessel after providing the sample analysis vessel with a water sample.

In certain embodiments, the method comprises:

backflushing the sample line up to the sampling point.

In certain embodiments, the backflushing is performed by fresh water. In certain embodiments, the backflushing is performed in between subsequent sample sucking periods.

In certain embodiments, the method comprises:

opening a backflush feed connection with a closing valve of the sample analysis vessel in an opened state, and switching the suction pump on so as to fill a fluid connection from the sampling point all the way to the suction pump with water (from the backflush feed connection); and closing the backflush feed connection thereafter. In this way a proper suction for sucking the water sample is initiated in certain embodiments.

In certain embodiments, the method comprises:

sucking water samples by the suction pump from a plurality of sampling points via a respective sample line.

In certain embodiments, the method comprises sucking water samples by the suction pump from the plurality of sampling points, one sample at a time.

In certain embodiments, the plurality of sampling points comprises at least one sampling point upstream of the solid-liquid separation unit and at least one sampling point downstream of the solid-liquid separation unit. In certain embodiments, each sampling point is associated with its own sample line. In certain embodiments, these sample lines enter a valve unit upstream of the sample analysis vessel. The valve unit comprises valves to control which sample line is connected to the sample analysis vessel (and further to the suction pump) at each particular time.

Accordingly, in certain embodiments, the method comprises:

selecting which of the respective sample lines is connected to the sample analysis vessel at each particular time with the aid of a valve unit.

In certain embodiments, the method comprises:

simulating, in the sample analysis vessel, a solid-liquid separation process that is ongoing in the solid-liquid separation unit.

In certain embodiments, the sample analysis vessel is a small-scaled sedimentation tank that simulates the sedimentation process of the actual sedimentation tank.

The presented method as disclosed hereinbefore suits well for instances in which the sample cannot be obtained into the sample analysis vessel without additional pumping (e.g., when the mere water pressure in the process stream is not enough for this).

According to a second example embodiment, there is provided an analysis equipment for analyzing a water sample, comprising:

an inlet configured to be brought into fluid communication with a sampling point upstream of a solid-liquid separation unit;

a sample analysis vessel configured to receive, via the inlet, a water sample from a sampling point, the equipment comprising:

a suction pump configured to be positioned after the sample analysis vessel, wherein the suction pump is configured to suck the sample into the sample analysis vessel via the inlet.

In certain embodiments, the inlet is configured to be brought into fluid communication with a sampling point by attaching a sample line in between the sampling point and the inlet.

In certain embodiments, the equipment is configured to suck the sample as a laminar flow from the sampling point to the sample analysis vessel.

In certain embodiments, the analysis equipment comprises:

a backflush feed for backflushing the sample line up to the sampling point.

In certain embodiments, the analysis equipment comprises:

a valve unit for sucking water samples by the suction pump from a plurality of sampling points, one at a time.

In certain embodiments, the analysis equipment comprises:

a valve unit configured to select which of the sample lines is connected to the sample analysis vessel at each particular time.

In certain embodiments, the valve unit is configured to be positioned upstream of the sample analysis vessel. In certain embodiments, an outlet of the valve unit is configured to be connected to said inlet.

In certain embodiments, the equipment comprises more than one inlet, each configured to be brought into fluid communication with a respective sampling point. According to a third example aspect of the invention there is provided a water treatment plant comprising a solid-liquid separation unit and the analysis equipment of the second aspect or of any of its embodiments.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps.

Figure 1:
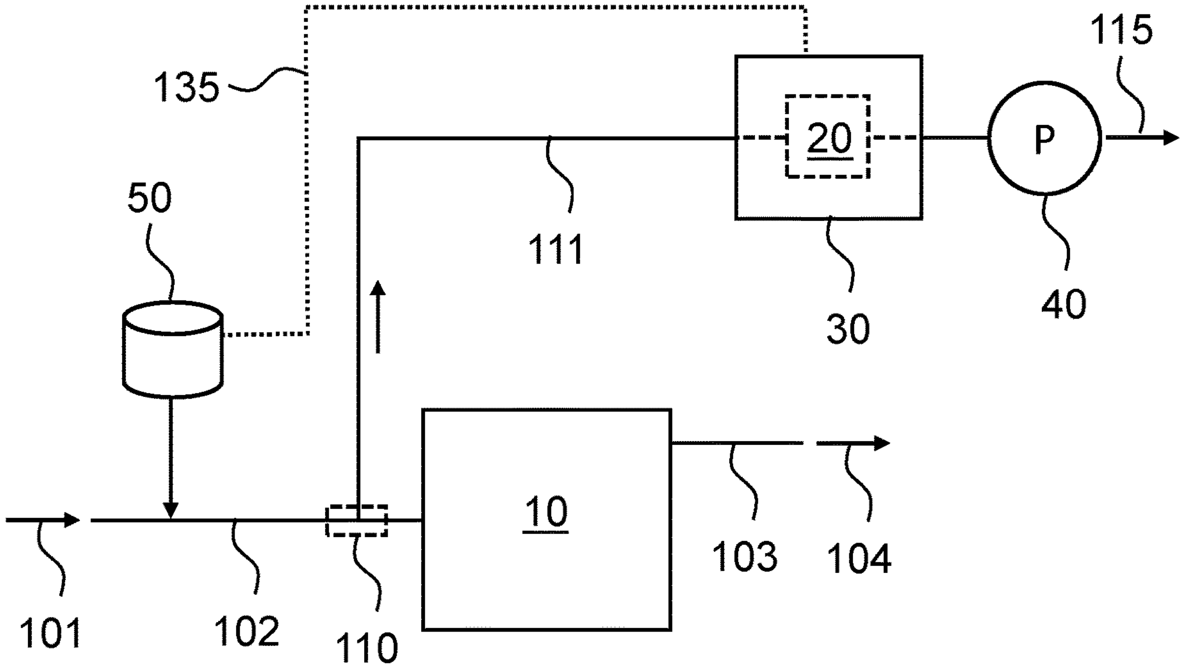
FIG. 1 schematically shows certain parts of a water treatment plant according to certain example embodiments.

FIG. 1 schematically shows certain parts of a water treatment plant or system according to certain example embodiments. In an example case the plant is a wastewater treatment plant. Wastewater received from a mechanical preliminary treatment (in which different objects have been removed from the wastewater by one or more screens) flows in a water channel 102 as depicted by arrow 101. Depending on the implementation, the channel 102 may be in the form of a canal or a pipeline or their combination, and it may contain one or more wells.

From the channel 102, the wastewater flows into a solid-liquid separation unit or tank 10 for primary treatment. The primary treatment in this case is based on sedimentation of particles in the wastewater. Accordingly, the solid-liquid separation unit 10 herein is called a sedimentation tank. In certain embodiments, the sedimentation tank 10 is a basin dug or embedded into the ground.

Certain chemicals, e.g., coagulant(s) and/or flocculant(s) are dosed into the wastewater flow prior to the wastewater enters the sedimentation tank 10. These chemicals aid solid particles in forming larger clusters, i.e. agglomerates, which are called flocs. These settle in the form of sludge, herein denoted as primary sludge, on the bottom of the sedimentation tank 10. FIG. 1 shows just one chemical tank 50 dosing, at a chemical dosing point, a chemical contained therein into the water flowing in the channel 102 (i.e. into a process stream). However, there may be more chemical tanks in the system. For example, in certain embodiments, a separate tank for a coagulant and a separate tank for a flocculant is provided for dosing these chemicals at their respective dosing points.

The primary sludge is separated from the sedimentation tank 10 for further processing. The wastewater from which the primary sludge has been separated, in turn, flows from the sedimentation tank 10 along an outlet channel 103 into a secondary treatment process as depicted by arrow 104.

The secondary treatment process may be based on biological processes. The proper functioning of the biological processes depends on the correct dosing of chemicals prior to the sedimentation tank 10. In order to provide information for controlling the dosing, water samples are taken from the process stream or channel 102 at a sampling point 110. In certain embodiments, the sampling point 110 is upstream of the sedimentation tank 10 but downstream of the chemical dosing point(s). A sample line 111 extends from the sampling point 110 at the channel 102 to a sample analysis vessel 20. The sample analysis vessel 20 in certain embodiments forms part of an analysis equipment (see FIG. 6, reference numeral 100) that performs analysis and/or measurements to verify the correct dosing of chemicals. In certain embodiments, the analysis equipment comprises a measurement apparatus 30 (e.g. a sedimentation simulation apparatus) comprising the sample analysis vessel 20. In certain embodiments, the sample analysis vessel 20 is implemented as a small-scaled sedimentation tank that simulates the sedimentation process of the actual sedimentation tank 10. Based on the analysis and/or measurements performed on the water samples, the analysis equipment (e.g. the measurement apparatus 30) controls of the dosage of floc forming chemical(s) via a connection 135 established to the chemical tank(s) 50 or their associated control system(s).

In certain embodiments, such as shown in the example case of FIG. 1, the sample line 111 extends from the sampling point 110 to the sample analysis vessel 20 and further to a suction pump 40 positioned after (i.e. downstream of) the sample analysis vessel 20. The suction pump 40 sucks the water samples from the sampling point 110 along the sample line 111 to the sample analysis vessel 20. And if needed, after the desired analysis and/or measurements have been performed, the suction pump 40 further sucks the sample from the sample analysis vessel 20 to a waste line as depicted by arrow 115.

By using suction, preferably with a laminar (i.e., non-turbulent) flow in the sample line 111, the formed flocs are better preserved compared to using pumps based on a push force (e.g. a submersible pump positioned within the channel 102). A sample under analysis obtained by sucking therefore better represents the prevailing conditions in the actual water treatment process.

Accordingly, in certain embodiments, the suction pump 40 sucks the water sample as a laminar flow from the sampling point 110 into the sample analysis vessel 20. In certain embodiments, the suction pump 40 sucks the water sample as a laminar flow from the sampling point 110 to the sample analysis vessel 20 and further to an outlet of the sample analysis vessel 20. Accordingly, the flow within the sample analysis vessel 20 is also laminar.

Figure 2:
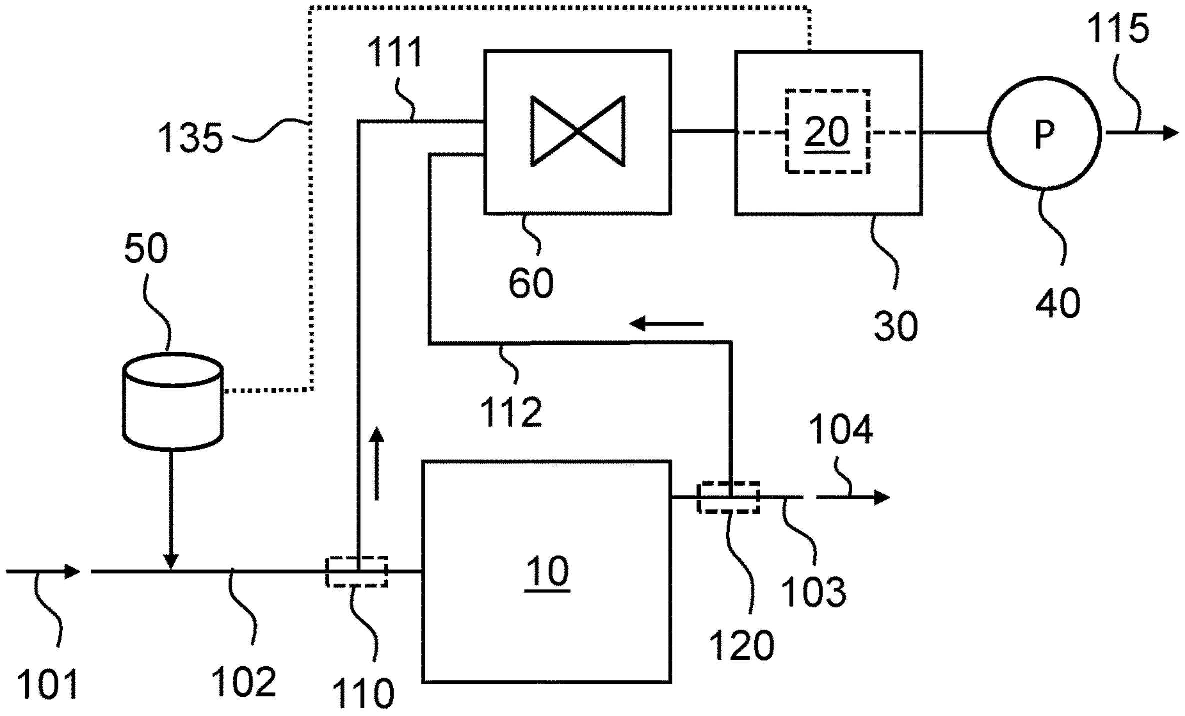
FIG. 2 schematically shows certain modifications to the water treatment plant of FIG. 1.

FIG. 2 schematically shows certain modifications to the water treatment plant of FIG. 1. In particular, the system shown in FIG. 2 enables sucking water samples by the suction pump 40 from a plurality of sampling points. In addition to the sampling point 110 at the channel 102, a further sampling point 120 is arranged into the wastewater outlet channel 103. Accordingly, the system comprises a sampling point upstream of the sedimentation tank 10 and a sampling point downstream of the sedimentation tank 10. Both the sample line 111 beginning at the first sampling point 110 as well as the second sample line 112 beginning at the second sampling point 120 extend to a valve unit 60 positioned before (i.e., upstream of) the sample analysis vessel 20. The valve unit 60 comprises valves to control which sample line is connected to the sample analysis vessel 20 (and further to the suction pump 40) at each particular time. Accordingly, in certain embodiments a plurality of samples is sucked, one at a time, with a single suction pump 40 from different sampling points into the sample analysis vessel 20 for analysis and/or measurement. The valve unit 60 is used to select which of the respective sample lines 111, 112 is connected to the sample analysis vessel 20 at each particular time.

Figure 3:
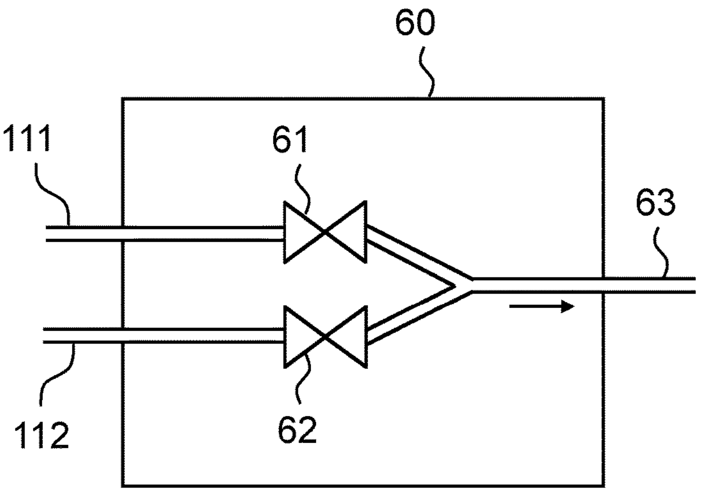
FIG. 3 schematically shows certain details of a valve unit according to certain example embodiments.

FIG. 3 schematically shows certain details of the valve unit 60 according to certain example embodiments. The valve unit 60 comprises two individually closable valves 61 and 62. The first sample line 111 is in flow communication with an inlet of the first valve 61, and the second sample line 112 is in flow communication with an inlet of the second valve 62. The outlet connections of valves 61 and 62 are joined together. A resulting common outlet line 63 of the valve unit 60 provides a connection towards the sample analysis vessel 20. The valves 61 and 62 may be opened and closed based on which of the sample lines 111, 112 is desired to be connected to the sample analysis vessel 20. The control of the valves 61 and 62 may be arranged locally or by the analysis equipment.

Figure 4:
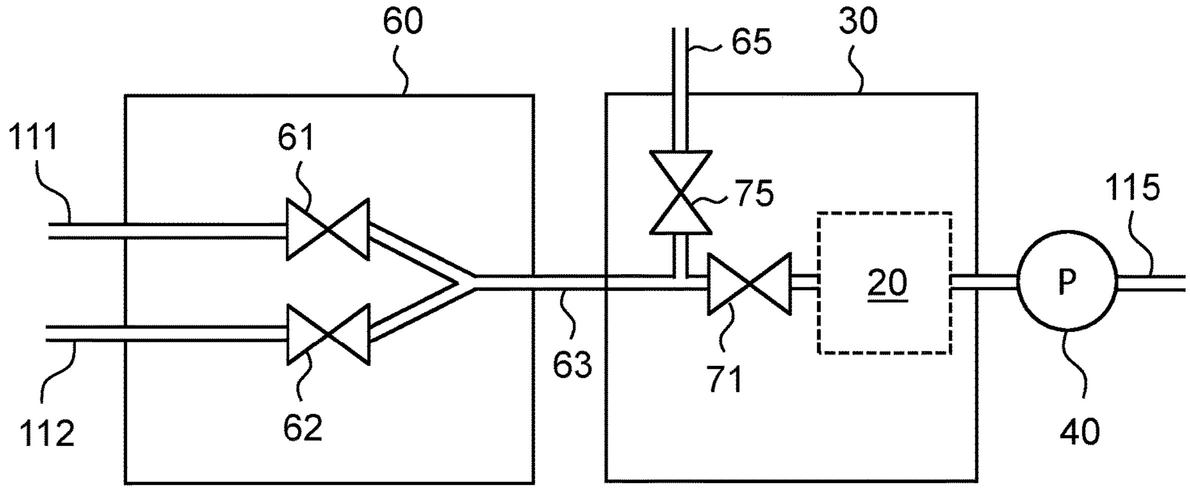
FIG. 4 schematically shows backflushing according to certain example embodiments.

FIG. 4 schematically shows a principle of backflushing according to certain example embodiments. Due to the dirty nature of the wastewater, the sample line(s) 111, 112 become dirty on a regular basis. In certain embodiments, such as shown in FIG. 4, the system is provided with a backflushing feature in order to clean the sample line(s). A backflush feed 65 is connected via a valve (backflush feed valve) 75 to an in-feed line of the sample analysis vessel 20. In the shown embodiment, the outlet line 63 of the valve unit 60 serves as the in-feed line. The in-feed line is provided with a closing valve 71 of the sample analysis vessel 20 upstream of the vessel 20. The backflush feed 65 connects with the in-feed line within the measurement apparatus 30 near the closing valve 71 (although alternative points of connection may be provided). In certain embodiments, the closing valve 71 is closed after providing the sample analysis vessel 20 with a water sample. The backflush feed 65 then feeds fresh water via the (opened) valve 75 into the in-feed line where it flows into a reversed direction towards the valve unit 60 and via the valve 61 or 62, depending on which valve 61 or 62 is open into the respective sample line 111 or 112 and up to the respective sampling point 110 or 120. With such a system the whole sample line from the measurement apparatus 30 up to the sampling point 110, 120 in question may be backflushed with fresh water.

During periods of sucking a sample into the sample analysis vessel 20 on the other hand the valve 71 is open and the valve 75 closed.

In certain embodiments, the backflush feed connection is opened (by opening valve 75) and the valve 71 is also opened. Further, the suction pump 40 is switched on. In this way, fresh water flows from the backflush feed (conduit) 65 into the in-feed line 63. The water flows via an opened valve 61 or 62 of the valve unit 60 towards a respective sampling point 110 or 120, but since the valve is also opened and the suction pump is ON, fresh water flows also via the valve 71 into the vessel 20 and to the suction pump 40 and further to the waste line 115. In this way, not only the respective sample line is backflushed but also the valve 71 and the vessel 20 are flushed. Furthermore, a fluid connection from a respective sampling point 110 or 120 all the way to the suction pump 40 becomes filled with water giving a proper initial suction for sucking the water sample into the vessel 20 when the valve 75 is closed.

Instead of two two-way valves a three-way valve may be used instead.

In a further embodiment, it is ensured that the water sample within the sample analysis vessel 20 correctly reflects water properties at the sampling point 111, 112. In certain embodiments, this is achieved by sucking water first from the sampling point 111, 112 via the sample analysis vessel 20 to the pump 40 and further through the pump 40 into the exhaust line 115 for a predetermined period of time, and only then switching the pump off. Accordingly, water is sucked from the sampling point 111, 112 via the sample analysis vessel 20 to the pump 40 and further through the pump 40 for a predetermined period of time prior to taking a sample. In this way the pump 40 will have more time to suck fresh water remaining in the pipelines away before the sample fills the vessel 20.

Figure 5:
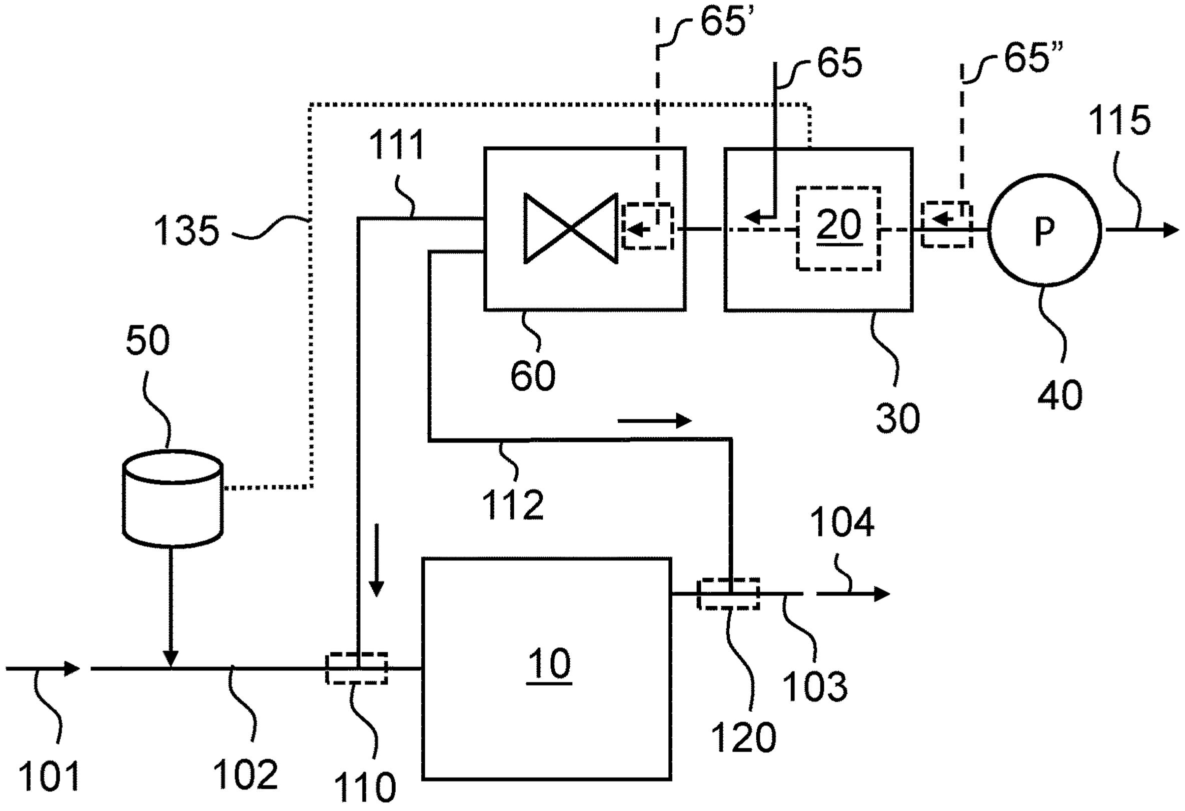
FIG. 5 schematically shows further examples concerning backflushing according to certain example embodiments.

FIG. 5 schematically shows connection points (shown by dashed line rectangles) for additional or alternative backflush feed connections 65' and 65", wherein valve arrangements like valves 75 and 71 shown in FIG. 4 can be included. The backflush feed connection 65' may be positioned in a pipeline within the valve unit 60. The backflush feed connection 65" may be positioned in a pipeline in between the sample analysis vessel 20 and the suction pump 40.

Figure 6:
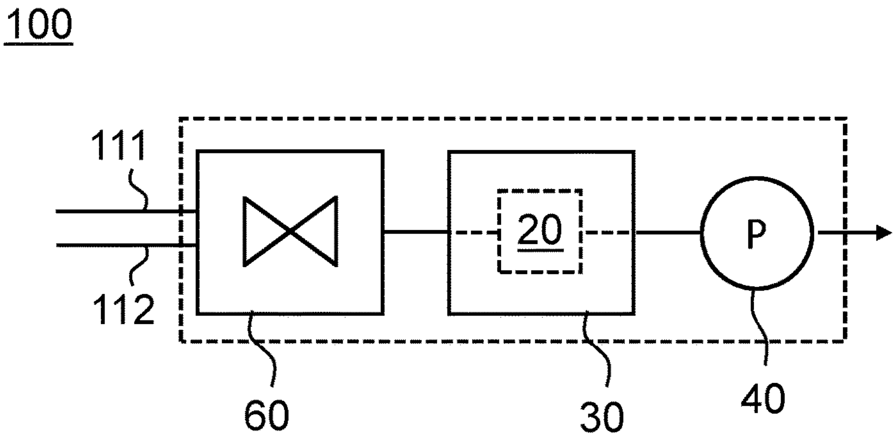
FIG. 6 schematically shows an analysis equipment according to certain example embodiments.

FIG. 6 schematically shows different parts of an analysis equipment 100 according to certain example implementations. In certain embodiments, the analysis equipment 100 comprises the sample analysis vessel 20, the suction pump 40 configured to be positioned after the sample analysis vessel 20 and at least one inlet (to which the valve unit 60 and/or a respective sample line may be attached depending on the embodiment) configured to provide the sample analysis vessel 20 with a water sample with the aid of suction provided by the suction pump 40. In further embodiments, the analysis equipment 100 further comprises a measurement apparatus 30 (e.g., the sedimentation simulation apparatus) housing the sample analysis vessel 20. In yet further embodiments, the analysis equipment 100 comprises the valve unit 60. The parts 20, 30 and 60, and optionally also the pump 40, are implemented within a single device in certain embodiments.

Figure 7:
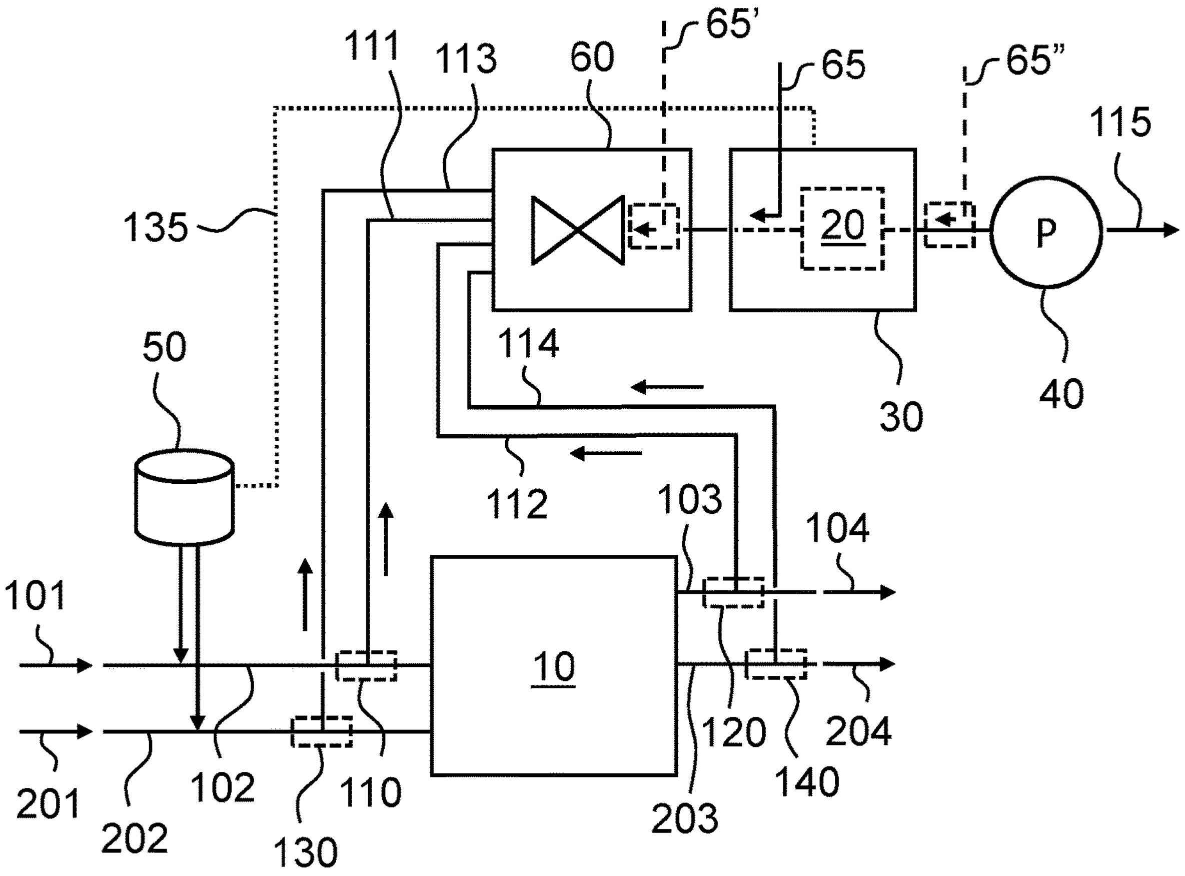
FIG. 7 schematically shows a water treatment plant with further sampling points according to certain example embodiments.

FIG. 7 schematically shows the water treatment plant with further sampling points according to certain example embodiments. In addition to the sampling points 110 and 120 shown in FIGS. 2 and 5, an additional sampling point 130 is provided in a water channel 202 which is a water channel parallel to the water channel 102 upstream of the sedimentation tank 10, and similarly receives wastewater from the mechanical preliminary treatment as depicted by arrow 201. A further additional sampling point 140 is provided in an outlet channel 203 which is an outlet channel parallel to the outlet channel 103 downstream of the sedimentation tank 10, and similarly conducts wastewater into a secondary treatment process as depicted by arrow 204. The sample line extending from the sampling point 130 towards the valve unit 60 is depicted by reference numeral 113, and the sample line extending from the sampling point 140 towards the valve unit 60 is depicted by reference numeral 114. As to the operation of the system shown in FIG. 7 a reference is made to preceding description, in particular to the embodiments shown in FIGS. 2, 4 and 5. The valve unit 60 in this embodiment comprises four individually closable valves. The outlet connections of the valves are joined together. A resulting common outlet line of the valve unit 60 provides a connection towards the sample analysis vessel 20. The valves may be opened and closed based on which of the sample lines 111-114 is desired to be connected to the sample analysis vessel 20.

The sample lines 111-114 mentioned in the preceding may be implemented by pipelines or hoses, for example.

In the preceding embodiments, the solid-liquid separation unit 10 has been explained to be a sedimentation tank of a wastewater treatment plant. However, it is to be understood that the description concerning the suction of samples via one or more sample lines as well as the backflushing feature is equally applicable in a raw water or drinking water treatment or purification plant once the sedimentation tank in the embodiments described in the foregoing is replaced by a solid-liquid separation unit (e.g. a sedimentation or flotation tank) of such a raw water or drinking water treatment or purification plant.

Without limiting the scope and interpretation of the patent claims, certain technical effects of one or more of the example embodiments disclosed herein are listed in the following. A technical effect is providing a sampling method that will not break up formed flocs in a water sample. Another technical effect is the ability to clean the sample line(s) after the water sample has been measured. Yet another technical effect is the ability to obtain a sample from a plurality of sampling points with a single pump.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method comprising:

providing a sample analysis vessel with a water sample from a sampling point upstream of a solid-liquid separation unit, wherein said providing a sample analysis vessel with a water sample comprises a suction pump, positioned after the sample analysis vessel, sucking the water sample from the sampling point to the sample analysis vessel via a sample line.

2. The method of claim 1, comprising:

sucking the sample as a laminar flow from the sampling point to the sample analysis vessel.

3. The method of claim 1, comprising:

sucking water from the sampling point via the sample analysis vessel to the pump and further through the pump for a predetermined period of time prior to taking a sample.

4. The method of claim 1, comprising:

closing a closing valve of the sample analysis vessel upstream of the sample analysis vessel after providing the sample analysis vessel with a water sample.

5. The method of claim 1, comprising:

backflushing the sample line up to the sampling point.

6. The method of claim 1, comprising:

opening a backflush feed connection with a closing valve of the sample analysis vessel in an opened state, and switching the suction pump on so as to fill a fluid connection from the sampling point all the way to the suction pump with water; and closing the backflush feed connection thereafter.

7. The method of claim 1, comprising:

sucking water samples by the suction pump from a plurality of sampling points via a respective sample line.

8. The method of claim 7, comprising:

selecting which of the respective sample lines is connected to the sample analysis vessel at each particular time with the aid of a valve unit.

9. The method of claim 1, wherein the solid-liquid separation unit comprises a sedimentation unit, or a flotation unit of a water treatment plant or system.

10. The method of claim 1, comprising:

simulating, in the sample analysis vessel, a solid-liquid separation process that is ongoing in the solid-liquid separation unit.

11. An analysis equipment for analyzing a water sample, comprising:

an inlet configured to be brought into fluid communication with a sampling point upstream of a solid-liquid separation unit;

a sample analysis vessel configured to receive, via the inlet, a water sample from a sampling point, wherein the equipment comprises:

a suction pump configured to be positioned after the sample analysis vessel, wherein the suction pump is configured to suck the sample into the sample analysis vessel via the inlet.

12. The analysis equipment of claim 11, wherein the equipment is configured to suck the sample as a laminar flow from the sampling point to the sample analysis vessel.

13. The analysis equipment of claim 11, comprising:

a backflush feed for backflushing the sample line up to the sampling point.

14. The analysis equipment of claim 11, comprising:

a valve unit for sucking water samples by the suction pump from a plurality of sampling points, one at a time.

15. A water treatment system comprising a solid-liquid separation unit and the analysis equipment of claim 11.

16. The method of claim 2, comprising:

sucking water from the sampling point via the sample analysis vessel to the pump and further through the pump for a predetermined period of time prior to taking a sample.

17. The method of claim 2, comprising: backflushing the sample line up to the sampling point.

18. The method of claim 3, comprising: backflushing the sample line up to the sampling point.

19. The method of claim 4, comprising: backflushing the sample line up to the sampling point.

20. The method of claim 2, comprising:

opening a backflush feed connection with a closing valve of the sample analysis vessel in an opened state, and switching the suction pump on so as to fill a fluid connection from the sampling point all the way to the suction pump with water; and closing the backflush feed connection thereafter.

* * * * *